Sept. 21, 1926.  
E. W. L. SKYRING  
1,600,520  
DIRIGIBLE HEADLIGHT  
Original Filed August 4, 1924

Inventor  
E. W. L. Skyring,  
By Marks Clerk  
Attys.

Patented Sept. 21, 1926.

1,600,520

UNITED STATES PATENT OFFICE.

ERNEST WILLIAM LEOPOLD SKYRING, OF COORPAROO, QUEENSLAND, AUSTRALIA.

DIRIGIBLE HEADLIGHT.

Application filed August 4, 1924, Serial No. 730,092. Renewed August 2, 1926.

This invention is for improvements in and relating to headlamps of motor cars and the like and refers more particularly to improvements whereby such headlamps will project light in a path to be taken by the front wheels of a vehicle such as a motor car when moving in a straight line ahead or whilst turning.

When the lamps on a motor car are fixed in a stationary position on the chassis, as is at present the practice generally, the path of light is governed by the direction of the chassis and not by the front wheels whilst turning. This is brought about by the front axle of the car being fixed, the wheels alone turning in arcs of different circles and being at an angle with each other.

It is desirable that the path of light should follow the direction of the front wheels and not the chassis whilst turning.

The object of my invention is to provide means whereby the lamps whilst mounted in their usual position on the body or chassis of the car are moved synchronously with the front wheels, their movement on the chassis being governed by the steering knuckle arm tie rod, whilst at the same time means are provided to compensate for the different relative positions assumed by the chassis and front axle due to unevenness of the road surface.

In order that the nature of my invention may be clearly understood reference will be had to the accompanying drawings in which like numerals refer to like parts in the different figures.

In adapting my invention to a motor car a block 1 is provided which fits snugly to the front axle where it may be clamped or bolted. It will be understood that in describing the application to one lamp the same refers also to the other lamp, and in this case two blocks are provided one for the attachment to each lamp.

Figure 5:
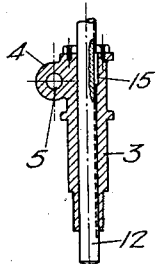
Figure 5 is a sectional view of the turning sleeve.
Figure 3:
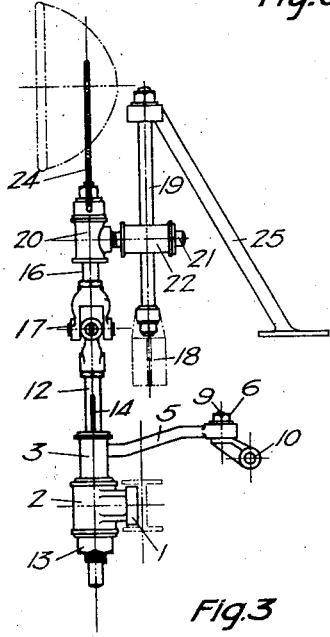
Figure 3 is a side elevation of Fig. 1.
Figure 1:
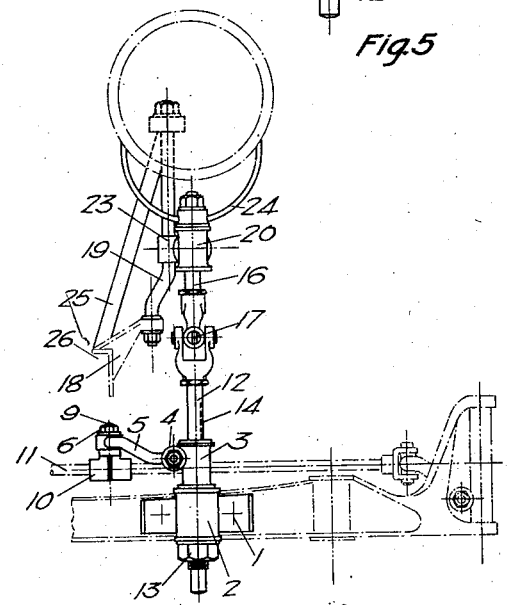
Figure 1 is a front elevation of my invention showing the adaptation to one lamp thereof.
Figure 4:
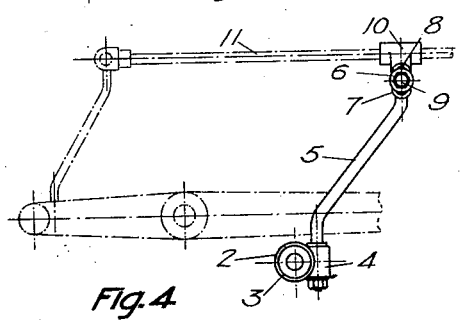
Figure 4 is a plan showing the position of the controlling arm in its relation to the axle and steering knuckle arm tie rod.
Figure 2:
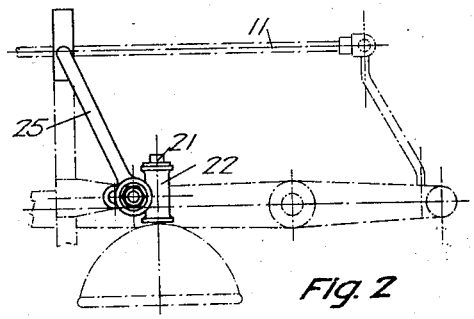
Figure 2 is a plan view of Fig. 1.

Cast with this block 1 is a bed bearing 2 in which turns the sleeve 3 held in position by a washer and nut 13 the said sleeve 3 (shown in section in Figure 5) having an arm 5 passing through a boss 4 and secured by a nut 6. The arm 5 (shown more particularly in Figs. 3 and 4) at its other end has a flattened portion 7 provided with a slot 8 in which works a pin 9 carried on a sleeve 10 secured to the steering knuckle arm tie rod 11. A nut and washer on the pin 9 are placed over the flattened end of the arm 5.

Passing down through the sleeve 3 is a compensating rod 12 provided with a keyway 14 in which works a feather 15 situated in the sleeve 3.

Figure 6:
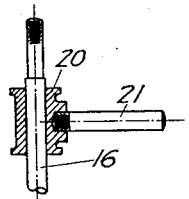
Figure 6 is a sectional view of the head shaft bearing.

The upper end of the compensating rod 12 is connected with a headshaft 16 by means of a universal joint 17. The headshaft 16 passes upwards through a bearing 20 having at one side a spindle arm 21 (see Figs. 3 and 6). This spindle arm 21 passes through a compensating bearing 22 provided with a sleeve 23 in which is secured the lamp carrying rod 19 which rod 19 is bolted or secured into the bracket 18 on the chassis (in some cases the lamp bracket now in use) mounted on the headshaft 16 above the bearing 20 between washers in the lamp bracket 24.

A supporting or strengthening rod 25 is secured to the top of the lamp carrying rod 19 and to the chassis 26.

In use the lamp is secured in the lamp bracket 24 the carrying rod 19 is bolted to the bracket 18, the strengthening rod 25 is bolted to the chassis 26 and top of lamp carrying rod 19, the block 1 is secured to the front axle by bolts or clamps, and the arm 5 is mounted on the steering knuckle tie rod arm by the sleeve 10.

As the steering wheel moves the steering knuckle tie rod arm the sleeve 10 secured thereto also moves, and the arm 5 turns the sleeve 3 and also the compensating rod 12 and head-shaft 16 to which is rigidly mounted the lamp bracket 24 thus turning the lamp. It will be understood that the desired set may be given to the arm 5. Thus the lamps turn synchronously with the wheels whilst still in a fixed position on the chassis.

In order to compensate for the different relative positions of axle and chassis, and avoid any breaking and jambing of the compensating rod 12 and headshaft 16 they are provided with a universal joint 17, and further provision is made whereby the sleeve 3 may move freely up and down on the compensating rod giving vertical motion to the axle in relation to the chassis.

It will be understood that the compensating bearing 22 always remains in the same position, any slight side movement being provided for by the spindle arm 21 rotating slightly therein.

I claim:—

1. Apparatus for turning the headlamps of motor cars and the like in the direction taken by the front wheels consisting of an arm connected to the knuckle arm tie rod and to a sleeve mounted in a bed bearing on the front axle, a keyway in the sleeve, a compensating rod having vertical movement in said sleeve held from rotating therein by a feather, a head shaft upon which is mounted the head lamp connected to the compensating rod by a universal joint, a lamp carrying rod attached to the chassis, around which rod is passed a bearing, a compensating bearing in which works a spindle arm secured in a bearing in which the head shaft turns the headlamp.

2. In apparatus for turning headlamps of motor cars and the like in the direction taken by the front wheels, a lamp carrying rod fastened to the chassis upon which is secured a sleeve in which a spindle rotates said spindle being secured in a bearing in which the vertical headshaft carrying the lamp rotates or turns.

In testimony whereof I have signed my name to this specification.

ERNEST WILLIAM LEOPOLD SKYRING.